(12) United States Patent
Li et al.

(10) Patent No.: US 8,552,096 B2
(45) Date of Patent: *Oct. 8, 2013

(54) FLAME-RETARDANT REINFORCED POLYCARBONATE COMPOSITIONS

(75) Inventors: Ying Li, Shanghai (CN); Yu Ren, Shanghai (CN); Chunjie Zhang, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/846,223

(22) Filed: Jul. 29, 2010

(65) Prior Publication Data

US 2011/0028615 A1    Feb. 3, 2011

Related U.S. Application Data

(60) Provisional application No. 61/230,150, filed on Jul. 31, 2009.

(51) Int. Cl.
*C08K 5/523* (2006.01)

(52) U.S. Cl.
USPC ............................ 524/127; 524/140; 524/141

(58) Field of Classification Search
USPC .......................................... 524/127, 140, 141
See application file for complete search history.

(56) References Cited

U.S. PATENT DOCUMENTS

| | | | |
|---|---|---|---|
| 3,686,355 A | 8/1972 | Gaines, Jr. et al. | |
| 3,775,367 A | 11/1973 | Nouvertne | |
| 3,988,389 A | 10/1976 | Margotte et al. | |
| 4,272,584 A | 6/1981 | Goldberg et al. | |
| 4,305,856 A | 12/1981 | Sakano et al. | |
| 4,569,970 A | 2/1986 | Paul et al. | |
| 4,579,906 A | 4/1986 | Zabrocki et al. | |
| 4,746,701 A | 5/1988 | Kress et al. | |
| 4,788,252 A | 11/1988 | de Boer et al. | |
| 4,931,503 A | 6/1990 | Boutni et al. | |
| 4,939,206 A | 7/1990 | Wang | |
| 4,983,658 A | 1/1991 | Kress et al. | |
| 5,023,297 A | 6/1991 | Boutni | |
| 5,036,126 A | 7/1991 | Rinehart et al. | |
| 5,206,281 A | 4/1993 | Furuta | |
| 5,236,988 A | 8/1993 | Doyama et al. | |
| 5,266,618 A | 11/1993 | Watanabe et al. | |
| 5,360,861 A | 11/1994 | Campbell | |
| 5,380,795 A | 1/1995 | Gosens et al. | |
| 5,391,600 A | 2/1995 | Umeda et al. | |
| 5,455,310 A | 10/1995 | Hoover et al. | |
| 5,488,086 A | 1/1996 | Umeda et al. | |
| 5,521,230 A | 5/1996 | Bhatia et al. | |
| 5,602,201 A | 2/1997 | Fujiguchi et al. | |
| 5,658,974 A | 8/1997 | Fuhr et al. | |
| 6,399,737 B1 | 6/2002 | Elkovitch | |
| 6,545,089 B1 | 4/2003 | DeRudder et al. | |
| 6,548,624 B2 | 4/2003 | Mitsuta et al. | |
| 6,576,706 B1 | 6/2003 | Nodera et al. | |
| 6,596,794 B1 | 7/2003 | Eckel et al. | |
| 6,613,820 B2 | 9/2003 | Fujiguchi et al. | |
| 6,630,525 B2 | 10/2003 | Cella et al. | |
| 6,657,018 B1 | 12/2003 | Hoover | |
| 6,762,228 B2 | 7/2004 | Seidel et al. | |
| 6,822,025 B2 | 11/2004 | Bajgur et al. | |
| 7,166,687 B2 | 1/2007 | Venderbosch et al. | |
| 7,232,854 B2 | 6/2007 | Ma et al. | |
| 7,232,865 B2 | 6/2007 | DeRudder et al. | |
| 7,319,116 B2 | 1/2008 | Eckel et al. | |
| 7,393,896 B2 | 7/2008 | DeRudder et al. | |
| 7,799,855 B2 | 9/2010 | Ebeling et al. | |
| 8,030,400 B2 | 10/2011 | Kung et al. | |
| 2003/0078331 A1 | 4/2003 | Kim et al. | |
| 2003/0139504 A1 | 7/2003 | Miebach et al. | |
| 2003/0158305 A1 | 8/2003 | Campbell et al. | |
| 2004/0034132 A1* | 2/2004 | Campbell et al. | 524/184 |
| 2005/0182165 A1 | 8/2005 | Ma et al. | |
| 2006/0030647 A1 | 2/2006 | Ebeling et al. | |
| 2006/0142455 A1* | 6/2006 | Agarwal et al. | 524/423 |
| 2006/0205848 A1* | 9/2006 | Siripurapu et al. | 524/115 |
| 2007/0045893 A1* | 3/2007 | Asthana et al. | 264/173.12 |
| 2007/0066740 A1* | 3/2007 | Odle et al. | 524/430 |
| 2007/0105994 A1 | 5/2007 | Li et al. | |
| 2008/0029744 A1 | 2/2008 | Jansen et al. | |
| 2008/0033083 A1 | 2/2008 | Li et al. | |

(Continued)

FOREIGN PATENT DOCUMENTS

| | | |
|---|---|---|
| BE | 1006984 A3 | 2/1995 |
| DE | 4016417 A1 | 11/1991 |

(Continued)

OTHER PUBLICATIONS

ASTM Designation: D256-10, Standard Test Methods for Determining the Izod Pendulum Impact Resistance of Plastics, 20 pages, 2010.

(Continued)

*Primary Examiner* — Peter Szekely
(74) *Attorney, Agent, or Firm* — Cantor Colburn LLP

(57) ABSTRACT

A composition containing a polycarbonate, a polycarbonate-polysiloxane copolymer, an alicyclic hydrocarbon resin flow promoter, an inorganic filler, a flame retardant and an impact modifier. The compositions may include polycarbonate in an amount of 40% by weight or more of the combined weights of the polycarbonate, polycarbonate-polysiloxane copolymer, inorganic filler, flame retardant, flow promoter, and impact modifier compound wherein a molded sample of the thermoplastic composition is capable of achieving UL94 V0 rating at a thickness of 1.2 mm (±10%); wherein the polymer composition has a melt viscosity of 185 Pa·sec or less, when measured at 270° C. and 1500 sec$^{-1}$; and wherein a molded sample of the thermoplastic composition has a flexural modulus determined in accordance with ASTM D790 within 3800-8000 MPa; and wherein a 3.2-mm thick molded NII bar comprising the composition has a notched Izod impact strength of 40 to 200 J/m determined in accordance with ASTM D256 at 23° C.

15 Claims, No Drawings

(56) References Cited

U.S. PATENT DOCUMENTS

| | | |
|---|---|---|
| 2009/0124749 A1 | 5/2009 | Steendam et al. |
| 2009/0209695 A1* | 8/2009 | Yu et al. .................. 524/451 |
| 2009/0312479 A1 | 12/2009 | Ren et al. |

FOREIGN PATENT DOCUMENTS

| | | |
|---|---|---|
| DE | 4024667 A1 | 2/1992 |
| EP | 0206006 A1 | 12/1986 |
| EP | 0247430 A2 | 12/1987 |
| EP | 0254054 A1 | 1/1988 |
| EP | 0376052 A2 | 7/1990 |
| EP | 0387570 A2 | 9/1990 |
| EP | 0434848 B1 | 7/1991 |
| EP | 0517927 B1 | 12/1992 |
| EP | 0522753 A2 | 1/1993 |
| EP | 0635547 A2 | 1/1995 |
| EP | 0645422 A1 | 3/1995 |
| EP | 0780438 A2 | 6/1997 |
| EP | 1489140 B1 | 12/2004 |
| EP | 1860155 A1 | 11/2007 |
| GB | 2043083 A | 10/1980 |
| JP | 56014549 A | 2/1981 |
| JP | 58011540 A | 1/1983 |
| JP | 04-225062 A | 8/1992 |
| JP | 4298554 A | 10/1992 |
| JP | 6322545 A | 11/1994 |
| JP | 7082467 A | 3/1995 |
| JP | 10-007897 A | 1/1998 |
| JP | 10101920 A | 4/1998 |
| JP | 2000063651 A | 2/2000 |
| JP | 2006249286 | 9/2006 |
| JP | 2006249287 | 9/2006 |
| JP | 2006306958 | 11/2006 |
| JP | 2008285507 A | 11/2008 |
| WO | 80/00084 A1 | 1/1980 |
| WO | 9105823 | 5/1991 |
| WO | 02/50185 A2 | 6/2002 |
| WO | 03/080729 A1 | 10/2003 |
| WO | 2005075549 A1 | 8/2005 |

OTHER PUBLICATIONS

ASTM Designation: D790-10, Standard Test Methods for Flexural Properties of Unreinforced and Reinforced Plastics and Electrical Insulating Materials, 11 pages, 2007.

ASTM Designation: D648-07, Standard Test Method for Deflection Temperature of Plastics Under Flexural Load in the Edgewise Position, 13 pages, 2007.

ASTM Designation: D638-10, Standard Test Method for Tensile Properties of Plastics, 16 pages, 2010.

ASTM Designation: D1238-10, Standard Test Method for Melt Flow Rates of Thermoplastics by Extrusion Plastometer, 15 pages, 2010.

International Search Report for International Application No. PCT/US2010/043911, 2010.

Belgium Patent No. 1006984; Publication Date: Feb. 7, 1995; Abstract Only, 1 page.

German Patent No. 4016417; Publication Date: Nov. 28, 1991; Abstract Only, 1 page.

German Patent No. 4024667; Publication Date: Feb. 6, 1992; Abstract Only, 1 page.

European Patent No. 0206006; Publication Date: Dec. 30, 1986; Abstract Only, 1 page.

European Patent No. 0247430; Publication Date: Dec. 2, 1987; Abstract Only, 1 page.

European Patent No. 0387570; Publication Date: Sep. 19, 1990; Abstract Only, 1 page.

European Patent No. 0780438; Publication Date: Jun. 25, 1997; Abstract Only, 1 page.

Japanese Patent No. 04-225062; Publication Date: Aug. 14, 1992; Abstract Only, 1 page.

Japanese Patent No. 10-007897; Date of Publication: Jan. 13, 1998; Abstract Only, 1 page.

Japanese Patent No. 10101920; Publication Date: Apr. 21, 1998; Abstract Only, 1 page.

Japanese Patent No. 4298554; Publication Date: Oct. 22, 1992; Abstract Only, 1 page.

Japanese Patent No. 56014549; Publication Date: Feb. 12, 1981; Abstract Only, 1 page.

Japanese Patent No. 58011540; Publication Date: Jan. 22, 1983; Abstract Only, 1 page.

Japanese Patent No. 6322545; Publication Date: Nov. 22, 1994; Abstract Only, 1 page.

Japanese Patent No. 7082467; Publication Date: Mar. 28, 1995; Abstract Only, 1 page.

Written Opinion of the International Searching Authority; International Application No. PCT/US2010/043911; International Filing Date: Jul. 30, 2010; Date of Mailing; Sep. 22, 2010; 6 pages.

JP2000063651 A, Publication Date: Feb. 29, 2000, Abstract Only, 1 page.

JP2008285507 A, Publication Date: Nov. 27, 2008, Abstract only, 1 page.

* cited by examiner

FLAME-RETARDANT REINFORCED POLYCARBONATE COMPOSITIONS

CROSS REFERENCE TO RELATED APPLICATIONS

The present application claims priority to U.S. Provisional Patent Application No. 61/230,150 filed Jul. 31, 2009, which is hereby incorporated by reference in its entirety.

FIELD OF THE INVENTION

The present invention relates to polycarbonate compositions, and in particular to filled flame retardant polycarbonate compositions that include flow promoters, methods of manufacture, and uses thereof.

BACKGROUND OF THE INVENTION

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers having many desired properties. They are highly regarded for optical clarity and enhanced impact resistance and ductility at room temperature or below.

Impact modifiers are incorporated into polymeric resins to improve the impact strength of finished articles made from such resins. Exemplary impact modifiers include acrylonitrile-butadiene-styrene (ABS) and methacrylate-butadiene-styrene (MBS) polymers. ABS and MBS polymers are synthetic thermoplastic resins made by polymerizing acrylonitrile or methacrylate, respectively, with styrene in the presence of polybutadiene. The properties of ABS and MBS can be modified by varying the relative proportions of the basic components, the degree of grafting, the molecular weight, etc. Overall, ABS and MBS are generally strong, and lightweight thermoplastics.

Flame retardant (FR) polycarbonate/acrylonitrile-butadiene-styrene blends are used in a variety of applications such as computer and business equipment, battery chargers, industrial housings, etc. These amorphous thermoplastic blends have many desired properties and/or characteristics, including high impact strength, heat resistance, good processability, weather and ozone resistance, good ductility, electrical resistance, aesthetic characteristics, etc. However, when making thin-walled parts, it is generally beneficial to provide a flow promoter to lower the melt viscosity and better enable the composition to be formed into a thin-walled part using a molding process. For non-flame retardant compositions, the use of a flow promoter is not problematic. However, as many flow promoters can themselves be flammable, their use in flame retardant compositions has been limited.

Accordingly, it would be beneficial to provide a flame retardant polycarbonate resin composition that includes flow promoters to help produce thin-walled parts but that does not have the issues associated with flame retardance and/or impact properties. It would also be beneficial to provide a flame retardant polycarbonate resin composition that has improved physical properties, such as heat deflection temperature, modulus and/or impact strength, despite the inclusion of a flow promoter.

SUMMARY OF THE INVENTION

The present invention provides a composition containing a polycarbonate, a polycarbonate-polysiloxane copolymer, a flow promoter, an inorganic filler, a flame retardant and an impact modifier. The compositions are especially useful in the formation of thin-walled flame retardant articles having excellent stiffness.

In one embodiment, the present invention provides a composition including a polycarbonate, a polycarbonate-polysiloxane copolymer, an impact modifier, an inorganic filler, a flame retardant, and an alicyclic hydrocarbon resin flow promoter; wherein the polymer composition has a melt viscosity of 185 Pa·sec or less, when measured at 270° C. and 1500 sec$^{-1}$; wherein a molded sample of the thermoplastic composition is capable of achieving UL94 V0 rating at a thickness of 1.2 mm (±10%); wherein a 3.2-mm thick molded NII bar comprising the composition has a notched Izod impact strength of 40 to 200 J/m determined in accordance with ASTM D256 at 23° C.; wherein a molded sample of the thermoplastic composition has a heat deformation temperature determined in accordance with ASTM D648 of 85° C. or greater; and wherein a molded sample of the thermoplastic composition has a flexural modulus determined in accordance with ASTM D790 within 3800 to 8000 MPa.

In another embodiment, the present invention provides a composition including 40 wt. % or more of a polycarbonate, 1 to 20 wt. % of a polycarbonate-polysiloxane copolymer, 1 to 15 wt. % of an impact modifier, 10 to 40 wt. % of an inorganic filler, 1 to 10 wt. % of an alicyclic hydrocarbon resin flow promoter, and 3 to 20 wt. % of a flame retardant; wherein the polymer composition has a melt viscosity of 185 Pa·sec or less, when measured at 270° C. and 1500 sec$^{-1}$; wherein a molded sample of the thermoplastic composition is capable of achieving UL94 V0 rating at a thickness of 1.2 mm (±10%); wherein a 3.2-mm thick molded N11 bar comprising the composition has a notched Izod impact strength of 40 to 200 J/m determined in accordance with ASTM D256 at 23° C.; wherein a molded sample of the thermoplastic composition has a heat deformation temperature determined in accordance with ASTM D648 of 85° C. or greater; and wherein a molded sample of the thermoplastic composition has a flexural modulus determined in accordance with ASTM D790 within 3800 to 8000 MPa.

In another embodiment, the present invention provides a composition including 40 wt. % or more of a polycarbonate, 3 to 15 wt. % of a polycarbonate-polysiloxane copolymer, 2 to 10 wt. % of an impact modifier, 15 to 30 wt. % of an inorganic filler selected from talc, wollastonite, glass fiber or a combination including at least one of the foregoing inorganic fillers, 2 to 8 wt. % of an alicyclic hydrocarbon resin, and 5 to 15 wt. % of an organic phosphate; wherein the polymer composition has a melt viscosity of 165 Pa·sec or less, when measured at 270° C. and 1500 sec$^-$; wherein a molded sample of the thermoplastic composition is capable of achieving UL94 V0 rating at a thickness of 1.2 mm (±10%); wherein a 3.2-mm thick molded N11 bar comprising the composition has a notched Izod impact strength of 70 to 150 J/m determined in accordance with ASTM D256 at 23° C.; wherein a molded sample of the thermoplastic composition has a heat deformation temperature determined in accordance with ASTM D648 of 85° C. or greater; and wherein a molded sample of the thermoplastic composition has a flexural modulus determined in accordance with ASTM D790 within 3800 to 7000 MPa.

In yet another embodiment, the present invention provides an article including a composition having a polycarbonate, a polycarbonate-polysiloxane copolymer, an impact modifier, an inorganic filler, a flame retardant, and an alicyclic hydrocarbon resin flow promoter; wherein the polymer composition has a melt viscosity of 185 Pa·sec or less, when measured at 270° C. and 1500 sec$^{-1}$; wherein a molded sample of the thermoplastic composition is capable of achieving UL94 V0 rating at a thickness of 1.2 mm (±10%); wherein a 3.2-mm thick molded N11 bar comprising the composition has a notched Izod impact strength of 40 to 200 J/m determined in accordance with ASTM D256 at 23° C.; wherein a molded sample of the thermoplastic composition has a heat deformation temperature determined in accordance with ASTM D648 of 85° C. or greater; and wherein a molded sample of the thermoplastic composition has a flexural modulus determined in accordance with ASTM D790 within 3800 to 8000 MPa.

The above-described and other features are exemplified by the following detailed description.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values. A range is considered to include support for all values contained within the range.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention is directed to flame retardant, reinforced polycarbonate compositions. These thermoplastic compositions include an aromatic polycarbonate, an impact modifier, inorganic fillers such as talc, wollastonite and/or glass fiber, a flow promoter, such as an alicyclic hydrocarbon resin, and a flame retardant. These compositions have been found to exhibit an excellent balance of high modulus, high flow, good ductility, and thin wall flame retardancy in thermoplastic polycarbonate compositions. The compositions are especially useful in the formation of thin-walled parts having flame retardant characteristics.

Accordingly, in one aspect, the present invention uses a polycarbonate resin as the base resin in the compositions. As used herein, the terms "polycarbonate" and "polycarbonate resin" mean compositions having repeating structural carbonate units of the formula (1):

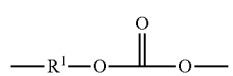

(1)

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

-A$^1$-Y$^1$-A$^2$- (2)

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, which includes dihydroxy compounds of formula (3)

HO-A$^1$-Y$^1$-A$^2$-OH (3)

wherein Y$^1$, A$^1$ and A$^2$ are as described above. Also included are bisphenol compounds of general formula (4):

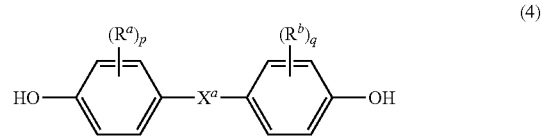

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

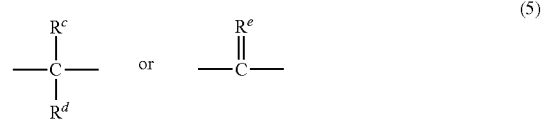

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1- dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethylbenzyl)phenol), 4-chloroformyl phthalic anhydride, trimesic acid, and benzophenone tetracarboxylic acid. The branching agents may be added at a level of about 0.05 to 2.0 wt. %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

"Polycarbonates" and "polycarbonate resins" as used herein further include blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

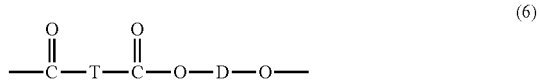

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene. The polycarbonate may have an intrinsic viscosity, as determined in chloroform at 25° C., of about 0.3 to about 1.5 deciliters per gram (dl/gm), specifically about 0.45 to about 1.0 dl/gm. The polycarbonate may have a weight average molecular weight of about 10,000 to about 200,000, specifically about 20,000 to about 100,000 as measured by gel permeation chromatography.

The copolyester-polycarbonate resins may also be prepared by interfacial polymerization. Rather than utilizing the dicarboxylic acid per se, it is possible to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid, has been incorporated. Furthermore, it is sometime desirable to have various concentrations of acid and hydroxyl end groups on the polyester, depending on the ultimate end use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

The blends of a polycarbonate and a polyester may include 1 to 99 wt. % polycarbonate and correspondingly 99 to 1 wt. % polyester, in particular a poly(alkylene terephthalate). In one embodiment, the blend includes 30 to 70 wt. % polycarbonate and correspondingly 70 to 30 wt. % polyester. The foregoing amounts are base on the total weight of the polycarbonate resin and polyester resin.

The compositions of the present invention generally include 40% or more by weight of the polycarbonate-based resin. In one embodiment, the compositions of the present invention include 45 to 80 wt % of the polycarbonate-based resin. In another embodiment, the compositions of the present invention include 50 to 70 wt % of the polycarbonate-based resin.

In addition to the polycarbonate-based resin, the compositions of the present invention further include a polycarbonate-polysiloxane copolymer. The polysiloxane blocks of the copolymer comprise repeating polydiorganosiloxane units of formula (8):

(8)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The foregoing groups may be fully or partially halogenated with fluorine, chlorine, bromine, or iodine, or a combination thereof. Combinations of the foregoing R groups may be used in the same copolymer.

The value of d in formula (8) may vary widely depending on the type and relative amount of each component in the thermoplastic composition, the desired properties of the composition, and like considerations. Generally, d may have an average value of 2 to about 1,000, specifically about 2 to about 500, more specifically about 5 to about 100. In one embodiment, d has an average value of about 10 to about 75, and in still another embodiment, d has an average value of about 40 to about 60. Where d is of a lower value, e.g., less than about 40, it may be desirable to use a relatively larger amount of the polycarbonate-polysiloxane copolymer. Conversely, where d is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of d of the first copolymer is less than the average value of d of the second copolymer.

In one embodiment, the polydiorganosiloxane blocks are provided by repeating structural units of formula (9):

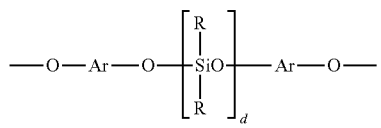
(9)

wherein d is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of formula (10):

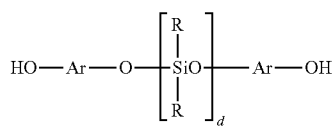
(10)

wherein Ar and d are as described above. Such compounds are further described in U.S. Pat. No. 4,746,701 to Kress et al. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprises units of formula (11):

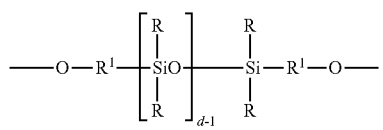
(11)

wherein R is as described above, d-1 is 1 to 1000, each occurrence of $R^1$ is independently a divalent $C_1$-$C_{30}$ hydrocarbylene, and wherein the polymerized polysiloxane unit is the reaction residue of its corresponding dihydroxy compound. In a specific embodiment, the polydiorganosiloxane blocks are provided by repeating structural units of formula (12)

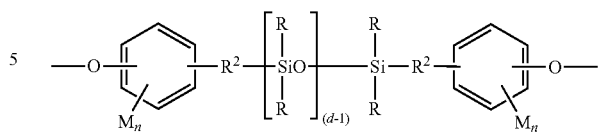
(12)

wherein R and d are as defined above. $R^2$ in formula (12) is a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_2$-$C_{12}$ aralkyl, $C_2$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

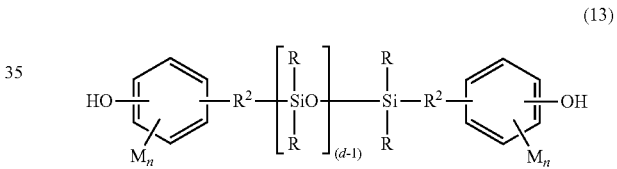
(13)

wherein R, d, M, $R^2$, and n are as described above. Such dihydroxy polysiloxanes can be made by effecting a platinum catalyzed addition between a siloxane hydride of formula (14)

(14)

wherein R and d are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The compositions of the present invention include from 1 to 20 wt % of the polycarbonate-polysiloxane copolymer. In one embodiment, the compositions of the present invention include 3 to 15 wt % of the polycarbonate-polysiloxane copolymer. In another embodiment, the compositions of the present invention include 5 to 12 wt % of the polycarbonate-polysiloxane copolymer.

The thermoplastic compositions of the present invention further include one or more impact modifier compositions to improve impact resistance. Suitable impact modifiers include elastomer-modified graft copolymers comprising (i) an elastomeric (i.e., rubbery) polymer substrate having a Tg less than about 10° C., more specifically less than about –10° C., or more specifically about –40° to –80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (15):

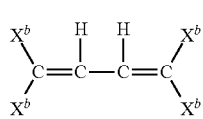

(15)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (16):

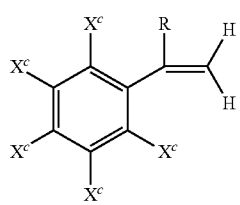

(16)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (17):

(17)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (17) include acrylonitrile, ethacrylonitrile, methacrylonitrile, alpha-chloroacrylonitrile, beta-chloroacrylonitrile, alpha-bromoacrylonitrile, acrylic acid, methyl (meth) acrylate, ethyl (meth)acrylate, n-butyl (meth)acrylate, t-butyl (meth)acrylate, n-propyl (meth)acrylate, isopropyl (meth) acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (15), (16) or (17). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and may have a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (16) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (17). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinyl aromatic monomer and comonomer in the rigid graft phase may vary widely depending on the type of elastomer substrate, type of monovinyl aromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinyl aromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (16) or (17), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methaacryloxypropyl)methyldimethoxysilane, to afford silicone rubber having an average particle size from about 100 nanometers to about 2 microns. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

The amount of impact modifier that is used in the compositions may vary depending on the type and whether the impact modifier is a single component or multiple components. In one embodiment, the amount of impact modifier used is from 1 to 15 wt %. In an alternative embodiment, the amount of impact modifier used is from 2 to 10 wt %.

The compositions of the present invention also include an inorganic filler. Suitable fillers include, for example, fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In further specific embodiments, the non-glass filler is a mineral filler. Exemplary mineral fillers include calcium carbonates, such as chalk, limestone, marble, synthetic precipitated calcium carbonates, or the like; talc, including fibrous, modular, needle shaped, lamellar talc, or the like; wollastonite; surface-treated wollastonite; kaolin, including hard kaolin, soft kaolin, calcined kaolin, kaolin comprising various coatings known in the art to facilitate compatibility with the polymeric matrix resin, or the like; mica, clay, carbon black, or the like, or combinations thereof.

The composition, when including a mineral filler, may include an acid or an acid salt. In one embodiment, the acid or acid salt is an inorganic acid or inorganic acid salt. In one embodiment, the acid is an acid including a phosphorous containing oxy-acid. In one embodiment, the phosphorous containing oxy-acid is a multi-protic phosphorus containing oxy-acid having the general formula (18):

$$H_m P_t O_n \tag{18}$$

where m and n are each 2 or greater and t is 1 or greater. Examples of the acids of formula (18) include, but are not limited to, acids represented by the following formulas: $H_3PO_4$, $H_3PO_3$, and $H_3PO_2$. Other exemplary acids include phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. Alternatively, acids and acid salts, such as, for example, sulphuric acid, sulphites, mono zinc phosphate, mono calcium phosphate, sodium acid pyrophosphate, mono natrium phosphate, and the like, may be used. The acid or acid salt is selected so that it can be effectively combined with the mineral filler to produce a synergistic effect and a balance of properties, such as flow and impact, in the polycarbonate or polycarbonate blend.

In specific embodiments, the mineral filler is talc. Generally, the talc can be of any shape, including fibrous, modular, needle shaped, or lamellar. In select embodiments, the talc may be surface treated with silanes to improve adhesion and dispersion with the polymeric matrix resin. Acid may also be included with the talc. In such embodiments, the weight ratio of acid to talc, or acid:talc weight ratio, may be from about 0.001 to about 0.04.

The amount of the inorganic filler may vary depending, in part, on the amount of filler used, the type of filler used, and the selected properties of the composition. In general, the total amount of the filler is, in one embodiment, from 10 to 40 wt % of the total weight of the composition. In an alternative embodiment, the filler is from 15 to 30 wt % of the total weight of the composition.

The compositions of the present invention also include a flow promoter. In one embodiment, the flow promoter is an alicyclic hydrocarbon resin. Without being limited by theory, it appears the alicyclic hydrocarbon resin works not only as a flow promoter, but unexpectedly also works as a compatibilizer between the filler and the other resins of the composition, which provides a balance of physical properties. Particularly useful are low molecular weight hydrocarbon resins derived from unsaturated $C_5$ to $C_9$ monomers. Non-limiting examples include cyclic olefins and diolefins, e.g. cyclopentene, cyclopentadiene, cyclohexene, cyclohexadiene, methyl cyclopentadiene and the like; and cyclic diolefin dienes, e.g., dicyclopentadiene, methylcyclopentadiene dimer and the like. The resins can additionally be partially or fully hydrogenated. Exemplary commercial low molecular weight hydrocarbon resins may include the following: hydrocarbon resins available from Eastman Chemical under the trademark Piccotac®; the fully hydrogenated alicyclic hydrocarbon resin based on $C_9$ monomers available from Arakawa Chemical Inc. under the trademark Arkon® and sold, depending on softening point, as Arkon® P140, P125, P115, P100, P90, P70 or the partially hydrogenated hydrocarbon resins sold as Arkon® M135, M115, M100 and M90; the fully or partially hydrogenated hydrocarbon resin available from Eastman Chemical under the tradename Regalite® and sold, depending on softening point, as Regalite® R1100, S1100, R1125, R1090 and R1010, or the partially hydrogenated resins sold as Regalite® R7100, R9100, S5100 and S7125; the hydrocarbon resins available from Exxon Chemical under the trade Escorez®, sold as the Escorez® 1000, 2000 and 5000 series, based on $C_5$, $C_9$ feedstock and mixes thereof, or the hydrocarbon resins sold as the Escorez® 5300, 5400 and 5600 series based on cyclic and $C_9$ monomers, optionally hydrogenated.

In particular embodiments, alicyclic saturated hydrocarbon resins are used. Such resins are available under the trade name Arkon™, available from Arakawa Chemical Industries, Ltd. The resin may have a number average molecular weight of about 1150. It can be odorless and colorless, have good weather resistance, and good compatibility with block rubber.

The amount of the flow promoter may vary depending, in part, on the type of filler used and the selected properties of the composition. In general, the total amount of the flow promoter is, in one embodiment, from 1 to 10 wt % of the total weight of the composition. In an alternative embodiment, flow promoter is from 2 to 8 wt % of the total weight of the composition.

The compositions of the present invention further include a phosphorus containing flame retardant, for example an organic phosphates and/or an organic compound containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl) phosphate, phenyl bis(3,5,5'-trimethylhexyl)phosphate, ethyl diphenyl phosphate, 2-ethylhexyl di(p-tolyl)phosphate, bis (2-ethylhexyl) p-tolyl phosphate, tritolyl phosphate, bis(2-ethylhexyl)phenyl phosphate, tri(nonylphenyl)phosphate, bis (dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

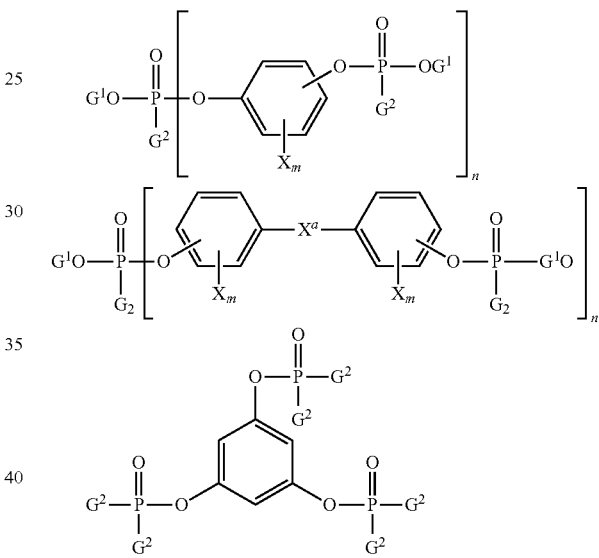

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl) phosphate of bisphenol-A (, respectively, their oligomeric and polymeric counterparts, and the like. Methods for the preparation of the aforementioned di- or polyfunctional aromatic compounds are described in British Patent No. 2,043,083.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. The organic phosphorus-containing flame-retardants are generally present in amounts of from 0.5 to 20 parts by weight, based on 100 parts by weight of the total composition, exclusive of any filler.

The thermoplastic composition may be essentially free of chlorine and bromine, particularly chlorine and bromine flame-retardants. "Essentially free of chlorine and bromine"

as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the thermoplastic composition it is based on the total weight of polycarbonate, polycarbonate-polysiloxane copolymer, impact modifier, flame retardant, and inorganic filler.

Optionally, inorganic flame retardants may also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of from 0.01 to 1.0 parts by weight, more specifically from 0.05 to 0.5 parts by weight, based on 100 parts by weight of polycarbonate resin, impact modifier, polysiloxane-polycarbonate copolymer, phosphorus-containing flame retardant, and stainless steel fiber.

The amount of the flame retardant added to the thermoplastic compositions of the present invention may be based on the selected properties of the thermoplastic compositions as well as molded articles made from these compositions. Other factors include the amount and/or type of thermoplastic resin used, the amount and/or type of flame retardant used, the amount and/or type of inorganic used, the amount and/or type of flow promoter used, and/or the amount and presence of other components in the thermoplastic compositions. In one embodiment, the flame retardant is present in amounts of from 3 to 20 wt. %. In another embodiment, the flame retardant is present in amounts from 5 to 15 wt. %.

Flame retardance of molded samples of the thermoplastic compositions of the present invention is excellent. In one aspect of measuring flame retardance, the UL94 standard utilizes a rating of V0 or V1, wherein a rating of V0 is better than V1. Using this standard, the thermoplastic compositions are formed into a molded article having a given thickness. The thinner the article, the more difficult it is to achieve a rating of V0 or V1. In one embodiment, a molded sample of the thermoplastic composition is capable of achieving UL94 V0 or V1 rating at a thickness of 1.5 mm (±10%). In another embodiment, a molded sample of the thermoplastic composition is capable of achieving UL94 V0 or V1 rating at a thickness of 1.2 mm (±10%). In still another embodiment, a molded sample of the thermoplastic composition is capable of achieving UL94 V0 or V1 rating at a thickness of 1.0 mm (±10%). In yet another embodiment, a molded sample of the thermoplastic composition is capable of achieving UL94 V0 or V1 rating at a thickness of 0.8 mm (±10%).

The compositions of the present invention may include, in alternative embodiments, an anti-drip agent. Examples of anti-drip agents that may be used include, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Anti-drip agents are generally used in amounts of 0.1 to 2 wt %, based on 100 parts by weight of the entire composition. In an alternative embodiment, the amount of anti-drip agent used is from 0.25 to 1 wt %.

The thermoplastic composition may also include various additives ordinarily incorporated in resin compositions of this type, with the proviso that the additives are preferably selected so as to not significantly adversely affect the desired properties of the thermoplastic composition. Mixtures of additives may be used. Such additives may be mixed at a suitable time during the mixing of the components for forming the composition. Examples of additives that may be included in the present invention include, but are not limited to, heat stabilizers, process stabilizers, antioxidants, light stabilizers, plasticizers, antistatic agents, mold releasing agents, UV absorbers, lubricants, pigments, dyes, colorants, or a combination of one or more of the foregoing additives.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.5 parts by weight, based on 100 parts by weight of total composition, excluding any filler.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.5 parts by weight, based on 100 parts by weight of total composition, excluding any filler.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.1 to about 1 parts by weight, based on 100 parts by weight of total composition, excluding any filler.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-b is [[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 1 parts by weight, based on 100 parts by weight of total composition, excluding any filler.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.5 to about 3 parts by weight, based on 100 parts by weight of the total composition, excluding any filler.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene glycol moieties, polyalkylene oxide units such as polyethylene glycol, polypropylene glycol, polytetramethylene glycol, and the like. Such polymeric antistatic agents are commercially available, such as, for example, Pelestat™ 6321 (Sanyo), Pebax™ H1657 (Atofina), and Irgastat™ P18 and P22 (Ciba-Geigy). Other polymeric materials that may be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 3 parts by weight, based on 100 parts by weight of total composition, excluding any filler.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.1 to about 10 parts by weight, based on 100 parts by weight of the composition, excluding any filler.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes; thioindigoid dyes; diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p- quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 5 parts by weight, based on 100 parts by weight of total composition, excluding any filler.

The thermoplastic compositions may be manufactured by methods generally available in the art, for example, in one embodiment, in one manner of proceeding, powdered polycarbonate resin, polycarbonate-polysiloxane copolymer, inorganic filler, impact modifier, flame retardant and other optional components are first blended, optionally with fillers, in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In some embodiments, the thermoplastic compositions of the present invention described herein have physical properties that include a Notched Izod Impact (NII) of from 40 to 200 Joules per meter (J/m) in one embodiment, or from 70 to 150 J/m in another embodiment. Notched Izod Impact (NII) data is obtained according to ASTM D256 and measured in J/m and % ductility at room temperature. Izod Impact Strength ASTM D 256 (ISO 180) ('NII') is used to compare the impact resistances of plastic materials. Percent ductility is determined using one-eighth inch (3.2 mm) bars at room temperature using the impact energy as well as stress whitening of the fracture surface. Generally, stress whitening can indicate ductile failure mode; conversely, lack of stress whitening can indicate brittle failure mode. Ten bars are tested, and percent ductility is expressed as a percentage of impact bars that exhibited ductile failure mode. Ductility tends to decrease with temperature, and the ductile transition temperature is the temperature at which % ductility falls below 50%.

As discussed, flame retardancy may be measured using one or more UL 94 tests. Thin walled articles present a particular challenge in the UL 94 tests because compositions suitable for the manufacture of thin articles tend to have a higher flow due to the use of flow promoters. However, as discussed, many flow promoters are hydrocarbon-based, which interferes with flame retardancy. Thermoplastic compositions according to the present invention that are suitable for the manufacture of a variety of articles will generally have a melt viscosity at 270° C./1500 sec$^{-1}$ of from 185 Pascal-second or less as measured in accordance with ISO 11443.

Tensile testing was done according to ASTM D638. Type I tensile bar specimens were placed in the grips of a tensile testing machine and then pulled until failure. The test speed was 5 mm/min.

Heat Deflection Temperature (HDT) data is measured at 1.82 MPa on 6.4 mm bars according to ASTM D648. HDT is a relative measure of a material's ability to perform for a short time at elevated temperatures while supporting a load. The test measures the effect of temperature on stiffness: a standard test specimen is given a defined surface stress and the temperature is raised at a uniform rate. The thermoplastic compositions of the present invention have a heat deflection temperature (HDT) of 85° C. or greater as measured according ASTM D648.

Flexural modulus is used as an indication of a material's stiffness when flexed. Flexural modulus data is measured using 3.2 mm×12.7 mm×125 mm bars according to ASTM D790. The test measures the force required to bend the bars under three point loading conditions and is used to select compositions that will support loads without flexing. The thermoplastic compositions of the present invention have a flexural modulus of 3800 to 8000 MPa.

Shaped, formed, or molded articles comprising the thermoplastic compositions of the present invention are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones and digital cameras, fixed electrical enclosures such as exit signs, humidifier housings and HVAC (heat ventilation and air conditioning) housings, electrical connectors, and components of lighting fixtures, ornaments, home appliances, roofs, greenhouses, sun rooms, swimming pool enclosures, and the like.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

EXAMPLES

The polycarbonate compositions are further illustrated by the following non-limiting examples, which are based on the following components:

PC-1: Low flow BPA polycarbonate polymer resin made by the interfacial process with a Mw of about 29,600 Daltons versus polycarbonate standards.

PC-2: High flow BPA polycarbonate polymer resin made by the interfacial process with a Mw of about 21,700 Daltons versus polycarbonate standards.

PC-Si: a BPA polycarbonate-polysiloxane copolymer comprising about 20% by weight of siloxane, 80% by weight BPA, PCP encapped.

The HRG used was high rubber graft emulsion polymerized ABS including 9.6-12.6 wt % acrylonitrile and 37-40 wt % styrene grafted to 49-51 wt % polybutadiene with a crosslink density of 43-55%.

The MBS used was methylmethacrylate-butadiene-styrene copolymer, with trade name EXL2691A from Rohm & Hass.

ABS: SABIC IP's Bulk ABS. Butadiene content of this material is typically 17% and the rest contains styrene and acrylonitrile. Various other forms of ABS having different butadiene, styrene and acrylonitrile content could also be used.

FP: The flow promoter used was low molecular weight hydrocarbon resin, Mn=1150, with trade name Arkon™ P-125 from Arakawa Chemical Industries, Ltd.

Fillers used were as below:

Talc: mean particle size of 1.8 microns, with commercial name R7 from Luzenac; mean particle size of 1.1 microns, with commercial name Jettfine 3CA from Luzenac.

Wollastonite: mean particle size of 4.5 microns, with trade name NYGLOS 4W10992 from NYCO Minerals Inc.

The flame retardant (FR) used was Bisphenol-A bis(diphenyl phosphate) (BPADP).

Glass fiber: Trade name 415A-14C from Owens Corning (China) investment Co., Ltd.

General polystyrene: Trade name G440K from Japan Polystyrene Inc.

SAN: high flow poly (styrene-acrylonitrile) from SABIC Innovative Plastics.

These formulations all contained SAN encapsulated PTFE standard antioxidants.

The components shown in the examples below also included (parts by weight) included 0.15 wt. % of a mold release agent (PETS). 0.08% of thermal stabilizer (Irganox 1076) and 0.08% of thermal stabilizer (Irgaphos 168) and were prepared by combining the listed components and melt extruding them on a Toshiba Twin screw extruder, using a nominal melt temperature of 260° C. and 400 rpm. Tests were all conducted in accordance with ASTM or ISO standards, referenced in each test below.

| | |
|---|---|
| Melt Viscosity, 270 C., 1500 s$^{-1}$ | ISO 11443 |
| Flexural testing, 1.27 mm/min | ASTM D790 |
| Flexural testing, 2 mm/min | ISO 178 |
| Tensile testing, 5 mm/min | ASTM D638 |
| Notched Izod Impact, 3.2 mm thickness bar | ASTM D 256 |
| HDT testing, 1.82 MPa, 6.4 mm | ASTM D648 |
| VX testing | UL 94 |

Flammability tests were performed following the procedure of Underwriter's Laboratory Bulletin 94 entitled "Tests for Flammability of Plastic Materials, UL94", which is incorporated herein by reference. According to this procedure, the materials were classified as either UL94 V0, UL94 V1 or UL94 V2 on the basis of the test results obtained for five samples. The procedure and criteria for each of these flammability classifications according to UL94, are, briefly, as follows:

Procedure: A total of 10 specimens (2 sets of 5) are tested per thickness. Five of each thickness are tested after conditioning for 48 hours at 23° C., 50% relative humidity. The other five of each thickness are tested after conditioning for seven days at 70° C. The bar is mounted with the long axis vertical for flammability testing. The specimen is supported such that its lower end is 9.5 mm above the Bunsen burner tube. A blue 19 mm high flame is applied to the center of the lower edge of the specimen for 10 seconds. The time until the flaming of the bar ceases is recorded. If burning ceases, the flame is re-applied for an additional 10 seconds. Again, the time until the flaming of the bar ceases is recorded. If the specimen drips particles, these shall be allowed to fall onto a layer of untreated surgical cotton placed 305 mm below the specimen.

Criteria for flammability classifications according to UL94:

| | V0 | V1 | V2 |
|---|---|---|---|
| Individual flame time (sec) | ≤10 | ≤30 | ≤30 |
| Total flame time of 5 specimens (sec) | ≤50 | ≤250 | ≤250 |
| Glowing time of individual specimens (sec) | ≤30 | ≤60 | ≤60 |
| Particles ignite cotton? | No | No | Yes |

Table 1 shows that in the compositions using HRG or MBS as impact modifier, along with the addition of 15 wt % talc to increase stiffness, there is a higher melt viscosity (#1, #3), which indicates a decrease in the processability of the filled materials. With the addition of 5 wt % of ARKON P-125 as a flow promoter, however, it can be seen that the melt viscosity could be obviously decreased (#2, #4), and the impact strength could be improved, at the same time keeping high modulus and very thin wall V0 performance. Additionally, for all these examples the HDT is above 85° C.

TABLE 1

| Description | Unit | #1 | #2 | #3 | #4 |
|---|---|---|---|---|---|
| PC-1 | % | 35.328 | 32.828 | 35.328 | 32.828 |
| PC-2 | % | 25.912 | 23.412 | 25.912 | 23.412 |
| PC-Si | % | 8 | 8 | 8 | 8 |
| HRG | % | 2.5 | 2.5 | | |
| MBS | % | | | 2.5 | 2.5 |
| talc | % | 15 | 15 | 15 | 15 |
| Others | % | 0.86 | 0.86 | 0.86 | 0.86 |
| FP | % | | 5 | | 5 |
| BPADP | % | 12.4 | 12.4 | 12.4 | 12.4 |
| App. Viscosity | Pa·s | 182 | 128 | 176 | 127 |
| Flexural Modulus (ASTM) | MPa | 4050 | 3800 | 3890 | 3880 |
| HDT | ° C. | 92 | 88 | 92 | 88 |
| Notched Impact Strength | J/m | 67 | 79 | 81 | 95 |
| V0/0.8 mm | — | pass | pass | pass | pass |

Table 2 shows the difference between ARKON P-125 and other flow promoters. Based on similar compositions, it can be seen that the addition of PS or SAN as the flow promoter led to a lower melt viscosity but worse impact strength and failed V0/1 mm flame testing. With the addition of ARKON P-125, similar flow and modulus could be achieved, at the same time keeping good impact strength and robust thin wall V0 performance, which is unique behavior compared to general flow promoters.

TABLE 2

| Description | Unit | #5 | #6 | #7 | #8 |
|---|---|---|---|---|---|
| PC-1 | % | 28.128 | 28.128 | 24.628 | 24.128 |
| PC-2 | % | 19.112 | 19.112 | 14.612 | 15.112 |
| PC-Si | % | 9 | 9 | 15 | 15 |
| talc | % | 18 | 18 | 18 | 18 |
| Others | % | 0.86 | 0.86 | 0.86 | 0.86 |
| FP | % | 5 | | 7 | |
| PS | % | | 5 | | |
| SAN | % | | | | 7 |
| ABS | % | 8.5 | 8.5 | 8.5 | 8.5 |
| BPADP | % | 11.4 | 11.4 | 11.4 | 11.4 |
| App. Viscosity | Pa·s | 110 | 108 | 82 | 84 |
| Modulus of Elasticity | MPa | 4720 | 4770 | 4377 | 4769 |

TABLE 2-continued

| Description | Unit | #5 | #6 | #7 | #8 |
|---|---|---|---|---|---|
| Notched Impact Strength | J/m | 76 | 54 | 77 | 59 |
| V0/1.0 mm | — | pass | fail, t > 10 s | pass | fail, t > 10 s |

Table 3 shows that with the combination of talc, wollastonite or glass fiber, the flexural modulus could arrive at 5.0-6.0 GPa with good ductility, but the melt viscosity was quite high (#9 #12). With the addition of flow promoter ARKON P-125 (#10 #11 #13), it can be seen that the melt viscosity could be obviously decreased, and the flexural modulus could even be improved or kept at similar level, at the same time keeping good impact strength and thin wall FR performance. There is slight decrease in HDT values with the addition of ARKON P-125, but for all these samples, the HDT is still above 85° C.

TABLE 3

| Description | Unit | #9 | #10 | #11 | #12 | #13 |
|---|---|---|---|---|---|---|
| PC-1 | % | 30.878 | 29.378 | 28.378 | 29.628 | 26.828 |
| PC-2 | % | 20.862 | 19.362 | 18.362 | 19.612 | 17.412 |
| PC-Si | % | 9 | 9 | 9 | 8 | 12 |
| MBS | % | 3 | 3 | 3 |  | 2.5 |
| ABS | % |  |  |  | 7.5 |  |
| talc plus wollastonite | % | 25 | 25 | 25 |  |  |
| talc plus glass fiber | % |  |  |  | 22 | 25 |
| Others | % | 0.86 | 0.86 | 0.86 | 0.86 | 0.86 |
| FP | % |  | 3 | 5 |  | 5 |
| BPADP | % | 10.4 | 10.4 | 10.4 | 12.4 | 10.4 |
| App. Viscosity | Pa·s | 174 | 143 | 118 | 165 | 146 |
| Flexural Modulus (ASTM) | MPa | 5150 | 5620 | 5610 | 5360 | 5200 |
| Flexural Modulus (ISO) | MPa | 5551 | 6102 | 6069 | — | — |
| HDT | ° C. | 92 | 89 | 87 | 93 | 89 |
| Notched Impact Strength | J/m | 95 | 94 | 94 | 82 | 78 |
| V0/1.0 mm | — | pass | pass | pass | pass | pass |

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic composition comprising:
a polycarbonate;
a polycarbonate-polysiloxane copolymer;
an impact modifier;
an inorganic filler, wherein the inorganic filler comprises talc, wollastonite, glass fiber or a combination including at least one of the foregoing inorganic fillers;
a flame retardant; and
an alicyclic hydrocarbon resin flow promoter;
wherein the polymer composition has a melt viscosity of 185 Pa-sec or less, when measured at 270° C. and 1500 sec$^{-1}$;
wherein a molded sample of the thermoplastic composition is capable of achieving UL94 V0 rating at a thickness of 1.2 mm (±10%);
wherein a 3.2-mm thick molded NIl bar comprising the composition has a notched Izod impact strength of 40 to 200 J/m determined in accordance with ASTM D256 at 23° C.;
wherein a molded sample of the thermoplastic composition has a heat deformation temperature determined in accordance with ASTM D648 of 85° C. or greater; and
wherein a molded sample of the thermoplastic composition has a flexural modulus determined in accordance with ASTM D790 within 3800-8000 MPa.

2. The composition of claim 1 wherein a 3.2-mm thick molded Nil bar comprising the composition has a notched Izod impact strength of 70 to 150 J/m determined in accordance with ASTM D256 at 23° C.

3. The composition of claim 1 wherein a molded sample of the thermoplastic composition is capable of achieving UL94 V0 rating at a thickness of 0.8 mm (±10%).

4. The composition of claim 1 wherein the impact modifier is selected from acrylonitrile butadiene styrene; methylmethacrylate-butadiene-styrene copolymer; a compound rubber-based graft copolymer produced by grafting a vinyl monomer to a compound rubber containing a polyorganosiloxane and a polyalkyl (meth)acrylate, or a combination including at least one of the foregoing impact modifiers.

5. The composition of claim 1 wherein the flame retardant comprises an organic phosphate.

6. An article comprising the composition of claim 1.

7. A method for forming an article comprising molding, extruding, shaping, or forming the composition of claim 1 to form the article.

8. A composition comprising:
40 wt. % or more of a polycarbonate;
1 to 20 wt. % of a polycarbonate-polysiloxane copolymer;
1 to 15 wt. % of an impact modifier;
10 to 40 wt. % of an inorganic filler, wherein the inorganic filler comprises talc, wollastonite, glass fiber or a combination including at least one of the foregoing inorganic fillers;
1 to 10 wt. % of an alicyclic hydrocarbon resin flow promoter; and 3 to wt. % of a flame retardant;
wherein the polymer composition has a melt viscosity of 185 Pa-sec or less, when measured at 270° C. and 1500 sec$^{-1}$;
wherein a molded sample of the thermoplastic composition is capable of achieving UL94 V0 rating at a thickness of 1.2 mm (±10%);
wherein a 3.2-mm thick molded NIl bar comprising the composition has a notched Izod impact strength of 40 to 200 J/m determined in accordance with ASTM D256 at 23° C.;
wherein a molded sample of the thermoplastic composition has a heat deformation temperature determined in accordance with ASTM D648 of 85° C. or greater; and
wherein a molded sample of the thermoplastic composition has a flexural modulus determined in accordance with ASTM D790 within 3800-8000 MPa.

9. The composition of claim 8 wherein a 3.2-mm thick molded NiI bar comprising the composition has a notched Izod impact strength of 70 to 150 J/m determined in accordance with ASTM D256 at 23° C.

10. The composition of claim 8 wherein a molded sample of the thermoplastic composition is capable of achieving UL94 V0 rating at a thickness of 0.8 mm (±10%).

11. The composition of claim 8 wherein the impact modifier is selected from acrylonitrile butadiene styrene; methylmethacrylate-butadiene-styrene copolymer; a compound rubber-based graft copolymer produced by grafting a vinyl monomer to a compound rubber containing a polyorganosiloxane and a polyalkyl (meth)acrylate, or a combination including at least one of the foregoing impact modifiers.

12. The composition of claim 8 wherein the flame retardant comprises an organic phosphate.

13. An article comprising the composition of claim 8.

14. A method for forming an article comprising molding, extruding, shaping, or forming the composition of claim 8 to form the article.

15. A composition comprising:
- 40 wt. % or more of a polycarbonate;
- 3 to 15 wt. % of a polycarbonate-polysiloxane copolymer;
- 2 to 10 wt. % of an impact modifier;
- 15 to 30 wt. % of an inorganic filler selected from talc, wollastonite, glass fiber or a combination including at least one of the foregoing inorganic fillers; 2 to 8 wt. % of an alicyclic hydrocarbon resin; and 5 to 15 wt. % of an organic phosphate;
- wherein the polymer composition has a melt viscosity of 165 Pa-sec or less, when measured at 270° C. and 1500 sec-1;
- wherein a molded sample of the thermoplastic composition is capable of achieving UL94 V0 rating at a thickness of 0.8 mm (±10%);
- wherein a 3.2-mm thick molded NiI bar comprising the composition has a notched Izod impact strength of 70 to 150 J/m determined in accordance with ASTM D256 at 23° C.;
- wherein a molded sample of the thermoplastic composition has a heat deformation temperature determined in accordance with ASTM D648 of 85° C. or greater; and
- wherein a molded sample of the thermoplastic composition has a flexural modulus determined in accordance with ASTM D790 within 3800-7000 MPa.

\* \* \* \* \*